US011941336B2

(12) United States Patent
Tan et al.

(10) Patent No.: US 11,941,336 B2
(45) Date of Patent: Mar. 26, 2024

(54) THREE-DIMENSIONAL FPGA WITH STRUCTURE ASIC HARDENING CAPABILITY

(71) Applicant: OPPSTAR TECHNOLOGY SDN BHD, Bayan Lepas (MY)

(72) Inventors: Kim Pin Tan, Jelutong (MY); Hun Wah Cheah, Batu Mauang (MY)

(73) Assignee: OPPSTAR TECHNOLOGY SDN BHD, Bayan Lepas (MY)

( * ) Notice: Subject to any disclaimer, the term of this patent is extended or adjusted under 35 U.S.C. 154(b) by 0 days.

(21) Appl. No.: 17/523,525

(22) Filed: Nov. 10, 2021

(65) Prior Publication Data

US 2023/0140876 A1  May 11, 2023

(51) Int. Cl.
*G06F 30/347* (2020.01)
*G06F 115/06* (2020.01)

(52) U.S. Cl.
CPC ........ *G06F 30/347* (2020.01); *G06F 2115/06* (2020.01)

(58) Field of Classification Search
CPC ..................................................... G06F 30/347
USPC ........................................................ 716/117
See application file for complete search history.

(56) References Cited

U.S. PATENT DOCUMENTS

| 10,886,921 | B1* | 1/2021 | Koganti | H01L 24/08 |
| 2002/0091507 | A1* | 7/2002 | Tseng | G06F 30/331 |
| | | | | 703/24 |
| 2009/0144678 | A1* | 6/2009 | Bose | G06F 11/2023 |
| | | | | 716/111 |
| 2016/0049941 | A1* | 2/2016 | How | H03K 19/17728 |
| | | | | 326/38 |
| 2019/0379380 | A1* | 12/2019 | Atsatt | H01L 25/18 |
| 2020/0119736 | A1* | 4/2020 | Weber | H03K 19/17756 |
| 2020/0328192 | A1* | 10/2020 | Zaman | H01L 25/0657 |
| 2022/0197329 | A1* | 6/2022 | Gaide | H01L 25/50 |

OTHER PUBLICATIONS

Anonymous. "3D ICs", https://www.xilinx.com/products/silicon-devices/3dic.html. Sep. 2021, pp. 1-7.
Anonymous. "Documentation: HardCopy Stratix Devices", HardCopy Series Handbook, vol. 1, Version 4.5. Sep. 2008, pp. 1-3.

* cited by examiner

*Primary Examiner* — Leigh M Garbowski
(74) *Attorney, Agent, or Firm* — Edward P. Ryan

(57) ABSTRACT

Circuit devices include a first chip that includes functional blocks. A second chip has routing circuitry that provides configurable signal communications between functional blocks of the first chip and configuration memory that controls the routing circuitry and that further controls operation of the functional blocks of the first chip.

19 Claims, 6 Drawing Sheets

| CRAM 101 | CRAM 101 | CRAM 101 | CRAM 101 | CRAM 101 | CRAM 101 | CRAM 101 | CRAM 101 |
|---|---|---|---|---|---|---|---|
| Routing 120 | Routing 120 | Routing 120 | Routing 120 | Routing 120 | Routing 120 | Routing 120 | Routing 120 |
| CRAM 101 | CRAM 101 | CRAM 101 | CRAM 101 | CRAM 101 | CRAM 101 | CRAM 101 | CRAM 101 |
| Logic 110 | Logic 110 | Logic 110 | Logic 110 | Logic 110 | Logic 110 | Logic 110 | Logic 110 |
| CRAM 101 | CRAM 101 | CRAM 101 | CRAM 101 | CRAM 101 | CRAM 101 | CRAM 101 | CRAM 101 |
| Routing 120 | Routing 120 | Routing 120 | Routing 120 | Routing 120 | Routing 120 | Routing 120 | Routing 120 |
| CRAM 101 | CRAM 101 | CRAM 101 | CRAM 101 | CRAM 101 | CRAM 101 | CRAM 101 | CRAM 101 |
| BRAM 106 | BRAM 106 | BRAM 106 | BRAM 106 | BRAM 106 | BRAM 106 | BRAM 106 | BRAM 106 |
| CRAM 101 | CRAM 101 | CRAM 101 | CRAM 101 | CRAM 101 | CRAM 101 | CRAM 101 | CRAM 101 |
| Routing 120 | Routing 120 | Routing 120 | Routing 120 | Routing 120 | Routing 120 | Routing 120 | Routing 120 |
| CRAM 101 | CRAM 101 | CRAM 101 | CRAM 101 | CRAM 101 | CRAM 101 | CRAM 101 | CRAM 101 |
| DSP 108 | DSP 108 | DSP 108 | DSP 108 | DSP 108 | DSP 108 | DSP 108 | DSP 108 |
| CRAM 101 | CRAM 101 | CRAM 101 | CRAM 101 | CRAM 101 | CRAM 101 | CRAM 101 | CRAM 101 |
| I/O 102 | I/O 102 | I/O 102 | I/O 102 | I/O 102 | I/O 102 | I/O 102 | I/O 102 |

Field programmable gate array
100

FIG. 1

THREE-DIMENSIONAL FPGA WITH STRUCTURE ASIC HARDENING CAPABILITY

BACKGROUND

Technical Field

Described herein are embodiments related to three-dimensional field programmable gate arrays (FPGAs), and, more particularly, to devices that separate logic and routing functions and structured application-specific integrated chips (ASICs).

Description of the Related Art

FPGAs are a type of reconfigurable circuit, which permits rapid deployment of new circuit designs to hardware. However, the configurability of FPGAs comes at a cost of performance and power consumption as compared to application-specific integrated chips. Additionally, FPGA devices may be more expensive than an application-specific device that performs the same function.

SUMMARY

A circuit device includes a first chip that includes functional blocks. A second chip has routing circuitry that provides configurable signal communications between functional blocks of the first chip and configuration memory that controls the routing circuitry and that further controls operation of the functional blocks of the first chip.

A circuit device includes functional layers that include functional blocks and a hardwired configuration path that outputs a configuration signal to control operation of a configured functional block of the functional blocks. Routing layers include a hardwired routing interconnect between a pair of functional blocks of the first chip.

A configurable routing chip includes inter-chip contacts and routing circuitry that implements configurable signal communications between a pair of inter-chip contacts. The routing circuitry includes routing blocks. Routing configuration random access memory (CRAM) blocks control the routing circuitry, each being associated with a respective routing block of the plurality of routing blocks. Functional block CRAM blocks output configuration signals to the inter-chip contacts.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 1 is a block diagram of a field programmable gate array (FPGA) device that includes a fabric of configurable blocks and routing blocks, in accordance with an embodiment of the present invention;

DETAILED DESCRIPTION

Figure 2:
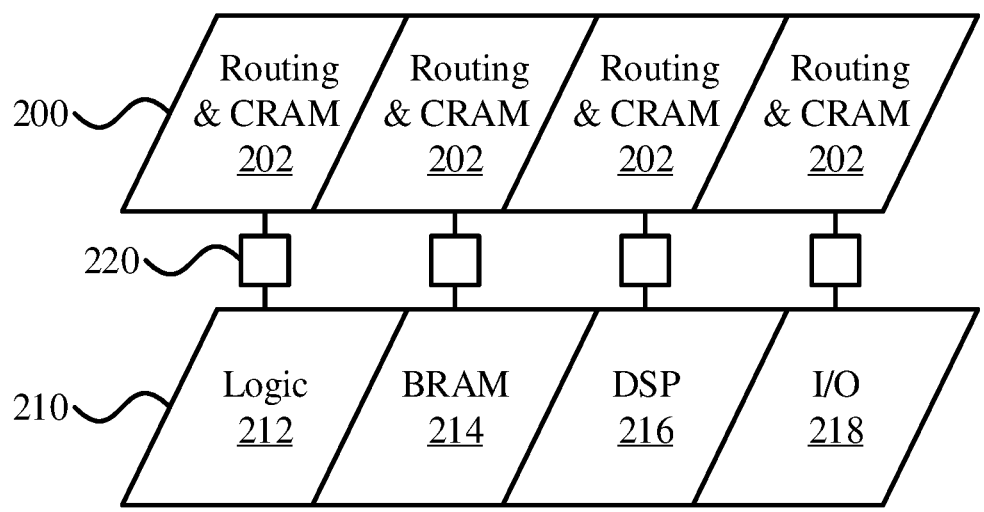
FIG. 2 is a block diagram of a two-chip FPGA device that separates configurable routing and configurable functionality into physically distinct chips, in accordance with an embodiment of the present invention.

A field programmable gate array (FPGA) may include a number of different programmable elements. For example, logic elements and memory may be connected to one another by configurable routing connections, making it possible to implement arbitrary circuits within certain resource constraints. However, extensive routing of signals may be needed to implement a given circuit within the fixed available resources. Routing the signals across multiple functional blocks within the FPGA increases the propagation delay of the signal and can cause increases in power loss and parasitic capacitance.

However, by separating the signal routing components of the FPGA from the functional components, implementing each on separate chips, the signal paths can be shortened substantially. This increases the performance of the chip. Additionally, once the FPGA design is finalized, a chip with hardwired routing can be manufactured and used in place of the FPGA, which replicates the functionality of the configurable routing without the relatively complicated circuitry, and without the need for a full application-specific integrated chip redesign. In this manner, the performance of a chip, which was originally implemented as an FPGA, can be enhanced, while also decreasing costs of the finalized circuit design. The final chip may replicate the functional layers of the two-chip FPGA, with additional routing layers that are integrated directly with the functional layers.

Referring now to FIG. 1, a block diagram of an illustrative embodiment of an FPGA 100 is shown. The FPGA 100 includes a fabric of configurable logic blocks 110. Although the fabric 100 is shown with a certain number of logic blocks 110, it should be understood that any appropriate number of logic blocks 110, and other ancillary blocks, may be used. These logic blocks 110 represent hardware components that perform logic operations which may be defined at run-time, according to hardware definition instructions. For example, the logic blocks 110 may include lookup tables LUTs that perform arbitrary computations, and may include further components, such as latches, digital logic, multiplexers, and other transistors. The logic blocks 110 may have a relatively simple internal structure, with complex operations being performed by connecting multiple logic blocks 110 using configurable interconnects. The logic blocks 110 may also have a relatively complex internal structure, with specific functions being performed according to internal configurations of the logic blocks 110. The logic blocks 110 may have differing internal structures, in accordance with the configuration of the FPGA 100. Input/output (I/O) blocks 102 provide inputs and outputs to the fabric of logic blocks 110.

The functions of the FPGA 100 may be configured at start-up, and may further be reconfigured or partially reconfigured during runtime. Thus, logic blocks 110 may be initialized with a first function when the device is powered up, and may later be reconfigured to perform different functions, for example responsive to an error or changing operational conditions. As will be described in greater detail below, this configurability may not be needed after a design has been finalized, making it possible to replace the configurable FPGA 100 with a device that has hardened routing.

Other components of the FPGA 100 may perform specific, hardwired functions. For example, a transceiver may provide communications with off-chip devices, block random access memory (BRAM) 106 may provide dedicated on-die data storage, and digital signal processor (DSP) 108 may provide complex signal computations. While these functions could be performed using circuitry that is implemented in the fabric of logic blocks 110, the inclusion of dedicated hardware components for common functions maximizes the available space for implementing user designs. Any appropriate functions may be implemented in this manner, beyond BRAM and DSP functions. Further, it should be understood that the relative positioning of I/O blocks 102, logic blocks 110, BRAM blocks 106, and DSP blocks 108 that is shown in FIG. 1 is purely exemplary and should not be interpreted as limiting.

Notably, when the design is finalized, the device may be replaced with a hardened device that has hardwired routing. The functionalities described above remain in the hardened device, as if they were still implemented within an FPGA, making it possible to re-use the functional chip components without a full ASIC redesign.

Each block may have a respective configuration random access memory (CRAM) 101, which provides configuration information for the block. In the case of a logic block 110, for example, the associated CRAM 101 may store information that determines the output values of any lookup tables in the logic block 110, as well as any other configuration information that may be needed to perform the logic block's function.

The configuration of the FPGA 100 uses routing blocks 120 to direct signals from one functional block to the next. The routing blocks 120 may include one or more multiplexers which can selectively pass signals to any appropriate neighboring block. The routing blocks 120 may have associated CRAMs 101 as well, which may store information that is used to determine the routing performed by the routing blocks 120. In this manner, a signal that originates in one block can be routed to any arbitrary destination block in the fabric 100. Because the destination block for a signal may be distant from the origin block for the signal, the signal path may cross multiple other functional blocks that are not related to the signal's function, but which are in the way. This transmission incurs a propagation delay, which increases with the length of the signal path. Additionally, longer propagation paths incur higher resistive losses and parasitic capacitances than shorter paths.

However, the routing circuitry and logic circuitry need not be formed on the same chip. Instead, the logical arrangement of elements shown in FIG. 1 may be implemented as a three-dimensional structure, using multiple chips. In this case, the signal path need not pass through multiple functional elements to reach the destination—it may instead be handled by a separate chip that is dedicated to the routing of signals. In this fashion, the signal path may be substantially decreased, thereby decreasing the signal propagation delay and associated resistive power losses.

Referring now to FIG. 2, a block diagram of a multi-chip FPGA is shown. The multi-chip FPGA includes a configurable routing chip 200 and a functional chip 210, with inter-chip connections 220 between vertically adjacent blocks of the respective chips. The configurable routing chip 200 may be mounted to the functional chip 210, and the inter-chip connections 220 provide electrical communications between the blocks of the respective chips.

Although only one line is shown for each of the inter-chip connections 220, it should be understood that there may be any appropriate number of physical conductive connections between any pair of adjacent blocks. Further, although only a single row of blocks is shown for the configurable routing chip 200 and the functional chip 210, each chip may have an arbitrarily large two-dimensional array of blocks. It is specifically contemplated that the configurable routing chip 200 may have the same number of blocks as the functional chip 210, but it should be understood that the functional chip 210 may also have a greater or lesser number of blocks than the configurable routing chip 200. The routing chip 200 may lack logic elements between the routing/CRAM blocks 202.

The chips may be implemented using any appropriate technology, including three-dimensional integrated chip technologies which use high-density bonds or any other appropriate multi-chip packaging technology. For example, system on integrated chip processes use small bonds, rather than solder bumps, to integrate multiple chips.

Rather than keeping configuration information on the functional chip 210, close to the functional blocks, configuration information may be stored on the configurable routing chip 200. Thus, configuration information may be supplied to each of the blocks of the functional chip 210 through the inter-chip connections 220. The CRAM information stored on the configurable routing chip 200 may control both the configuration of the functional chip 210, as well as the routing paths of the routing blocks 202.

Each of the functions of an FPGA may be implemented on the functional chip 210, including logic blocks 212, memory blocks 214, DSP blocks 216, and I/O blocks 218. It should be understood that the depiction of FIG. 2 illustrates a generalized arrangement of the functional blocks, and that the blocks may be arranged in any appropriate fashion across the surface of a two-dimensional chip surface.

In some examples, the functional chip 210 may lack any interconnections between the respective functional blocks, such that any communication between functional blocks needs to pass through the configurable routing chip 200. In other examples, functional blocks of the functional chip 210 may include interconnections with neighboring functional blocks, while using routing blocks 202 to communicate with distant functional blocks.

By sending signals through the routing blocks 202 on the configurable routing chip 200, signal propagation distance can be decreased by up to 50% as compared to signal paths that include both routing blocks and functional blocks. In the specific example shown in FIG. 2, to transmit a signal from a logic block 212 to an I/O block 218, the signal passes through four routing blocks 202. In contrast, if the routing and functionality were implemented on the same chip, with routing blocks being interposed between functional blocks, the signal would have to pass through four routing blocks and four functional blocks.

This decrease in signal path length and propagation delay increases performance of the FPGA device, as functional blocks need not wait as long to receive input signals. Additionally, the configurable routing chip 200 need not be fabricated with the same process technology as the functional chip 210. For example, components of the configurable routing chip 200 may be significantly less dense than those of the functional chip 210, making it possible to use fabrication processes that use larger feature sizes, which may be available for a lower cost than fabrication with more advanced fabrication processes would be. Additionally, fabrication processes may be used that provide better resistance and capacitance properties than the processes used for the functional chip 210. Thus, long wires on the routing chip 200, fabricated with a larger feature size than the process used for the functional chip, may have better performance.

Figure 3:
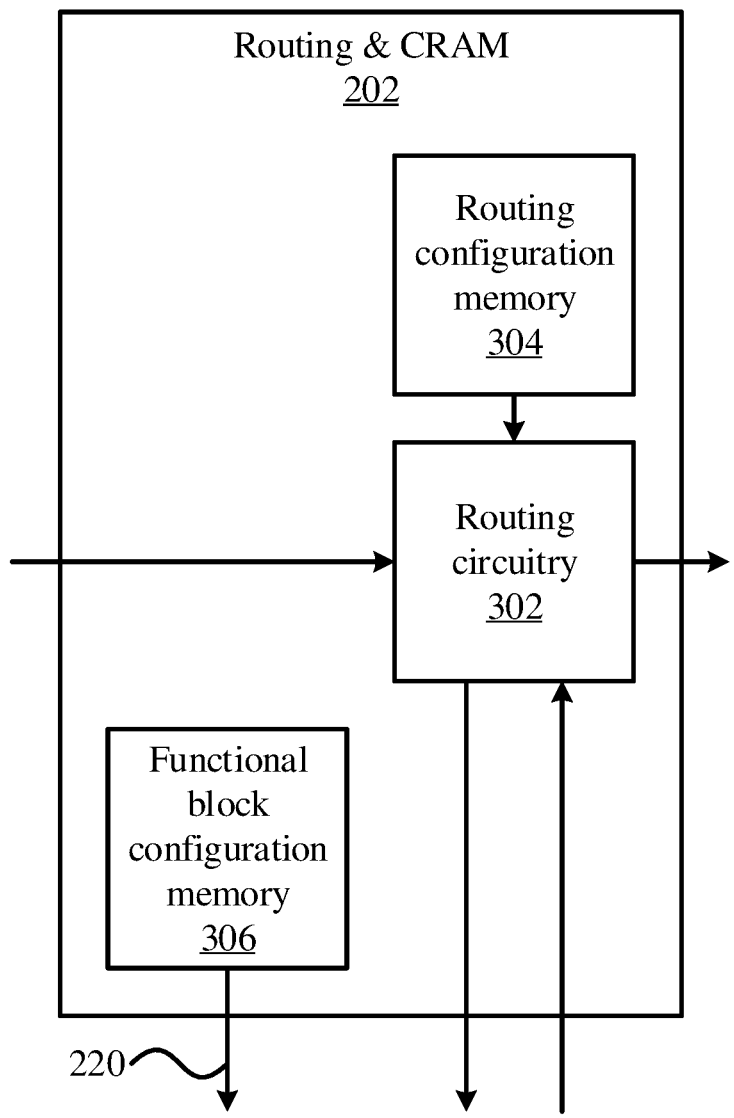
FIG. 3 is a block diagram of a routing and configurable random access memory block of a routing chip, providing configurable routing and also providing functionality configuration information, in accordance with an embodiment of the present invention.

Referring now to FIG. 3, additional detail on the routing & CRAM block 202 is shown. Each block 202 includes routing circuitry 302. The routing circuitry 302 may include, for example, one or more multiplexers that accept respective input signals from outside the block 202 and that forward the input signals to other routing blocks 202 and to the functional chip 210. The routing performed by the routing circuitry 302 is controlled by routing configuration memory 304. For example, the routing configuration memory 304 may store selection signal values that are used to control the outputs of the multiplexer(s) of the routing circuitry 302. These selection signal values may be set at the time that the FPGA device is initialized to implement a given circuit design.

As shown, the routing circuitry 302 may communicate laterally, indicating communications with other routing blocks 202 on the same configurable routing chip 200, or vertically, indicating communications with a functional block on the functional chip 210, via the inter-chip connection 220. These communications may be transmitted by any appropriate interconnects, which may be formed by any appropriate process. For example, the interconnects may include interconnects that are formed using three-dimensional semiconductor fabrication processes. The routing block 202 may furthermore include conductive surface contacts, in electrical communication with the routing circuitry 302, to form an electrical connection with the inter-chip connections 220.

The functional block configuration memory 306 similarly stores signal values, with these signal values being used to configure the operation of a corresponding functional block in the functional chip 210. For example, the functional block configuration memory 306 may include values that control the operation of a lookup table in a logic block 212. These signals may be communicated to the functional block via inter-chip connections 220.

These functions of the configurable routing chip 200 may be configurable at startup of the FPGA device. The contents of the routing configuration memory 304 and the functional block configuration memory 306 may be set in accordance with a given circuit design to be implemented by the FPGA device. During development of the circuit design, these values may be altered as needed to reconfigure the FPGA device, for example by changing the operation of functional blocks on the functional chip 210 or by changing routing paths on the configurable routing chip 200.

Figure 4:
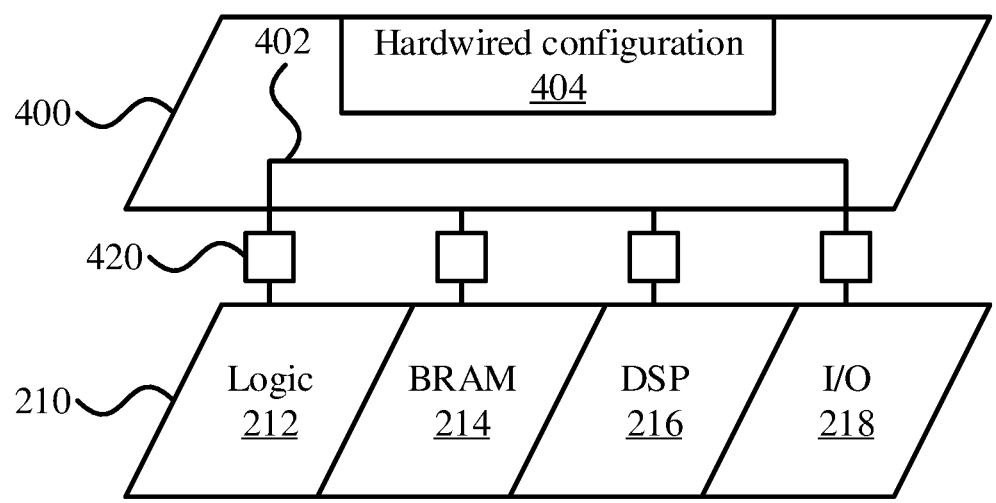
FIG. 4 is a block diagram of a hardened device that replaces the configurable routing chip of a two-chip FPGA with hardened routing layers that replicate the functionality of the configurable routing chip with hard-wired components, in accordance with an embodiment of the present invention.

Referring now to FIG. 4, a block diagram of a device with hardened routing is shown. As used herein, the term "hardening" refers to a process for replicating the functions of a programmed configurable circuit with a hardwired circuit. Thus a "hardened" circuit may perform the same functions as a corresponding configurable circuit, after the configurable circuit has been programmed, but may need no programming or configuration to operation.

In this example, the configurable routing chip 200 may be omitted, and the functions of the configurable routing chip 200 may be replaced by hardened routing layer(s) 400. The hardened routing layer(s) 400 may communicate with the inter-chip connections 420. For example, these connections 420 may be implemented as vias that communicate signals between layers of the chip. Thus, the hardened routing layers 400 may include hardwired routing paths 402 and hardwired configuration signals 404 to provide routing and configuration to the functional layers (210). The hardened routing layer(s) 400 may include multiple vertically stacked layers, to provide for the ability or hardwired routing paths 402 to cross as needed.

When manufacturing a device with hardened routing, the mask set of the original functional chip 210 and masks for the additional hardened routing layer(s) 400 (with the tied-high/tied-low hardwire configuration connections 404 to replace functional block CRAM) will form the complete mask set for the hardened design. The functional layers 210 may thus replicate the design of the original functional chip 210. This new complete mask set will be used by the foundry to fabricate the hardened design. The hardened design may be effectively a single monolithic chip with the same area of the original functional chip.

As described above with respect to the configurable routing chip 200, the hardened routing layer(s) 400 may be fabricated with a different technology than that which is used for the functional layers 210. For example, a process with a larger minimum feature size may be used. This may reduce the expense of fabricating the hardened routing layer(s) 400 and may provide superior electrical performance in the routing lines.

In contrast to the configurable routing chip 200, which includes the configurable routing/CRAM blocks 202, the hardened routing layer(s) 400 may include no configurable components. Instead, the hardened routing layer(s) 400 may replicate the functionality of a circuit design that is implemented by the configurable routing chip 200, using fixed interconnections. Thus, the hardwired routing paths 402 may include direct connections from a source functional block to a destination functional block, with no intervening circuitry. The design of the hardwired configuration 404 may be selected to perform timing closure, for example for hold time, before the hardened design is finalized. The hardwired routing paths 402 may include interconnects that transmit signals across the hardened routing layers 400, and may further include any vias 420 needed to reach the functional layers 210. The interconnects may be formed using any appropriate process to create conductive wires.

Although only a single hardwired routing path 402 is shown, it should be understood that any appropriate number of such paths 402 may be provided in the hardened routing layers 400. The hardened routing layers 400 may include multiple layers of interconnects, using vias to connect vertically adjacent layers, to provide the ability for hardwired routing paths 402 to cross over or under one another.

The hardwired configuration 404 may include hardwired connections that provide fixed binary configuration signals to the functional blocks of the functional chip 210. For example, if a configurable routing chip 200 included a routing/CRAM block 202 that stored certain configuration signals and provided those configuration signals to a logic block 212, the hardwired configuration 404 of the hardwired routing layers 400 may replicate those configuration signals in a hardwired fashion. In cases where the configuration signals include digital values that correspond to a "high" voltage and a "low" voltage, the hardwired configuration 404 may replicate these configuration signals by connecting corresponding vias 420 directly to power circuitry, such as a power source on the functional layers 210. The power circuitry may include, for example, a power plane or rail and a ground plane or rail. Thus, a "high" voltage configuration signal may be hardwired by connecting the appropriate inter-chip connection 220 to an input voltage source, and a "low" voltage configuration signal may be hardwired by connecting the appropriate inter-chip connection 220 to ground.

Strictly speaking, the hardened FPGA device is not a programmable device. The hardened device uses the configurable functional blocks of the functional chip 210, but the hardwired configuration signals 404 fix the configuration of those functional blocks. In this manner, an FPGA circuit design may be easily transferred to a relatively inexpensive hardwired design, without the additional design expense that would otherwise be needed to transfer the circuit's functionality to a completely application-specific integrated chip (ASIC). The hardened routing layers 400 will additionally provide reduced power consumption as compared to the configurable routing chip 200 while performing the same function, as programmable multiplexers, drivers, and memory circuits that would be used for routing and configuration information storage are not needed. Additionally, the hardened routing layers 400 may have superior single-event upset tolerance as compared to a conventional FPGA or configurable two-chip FPGA, as there are no CRAM structures to be affected by ionizing particle events.

Figure 5:
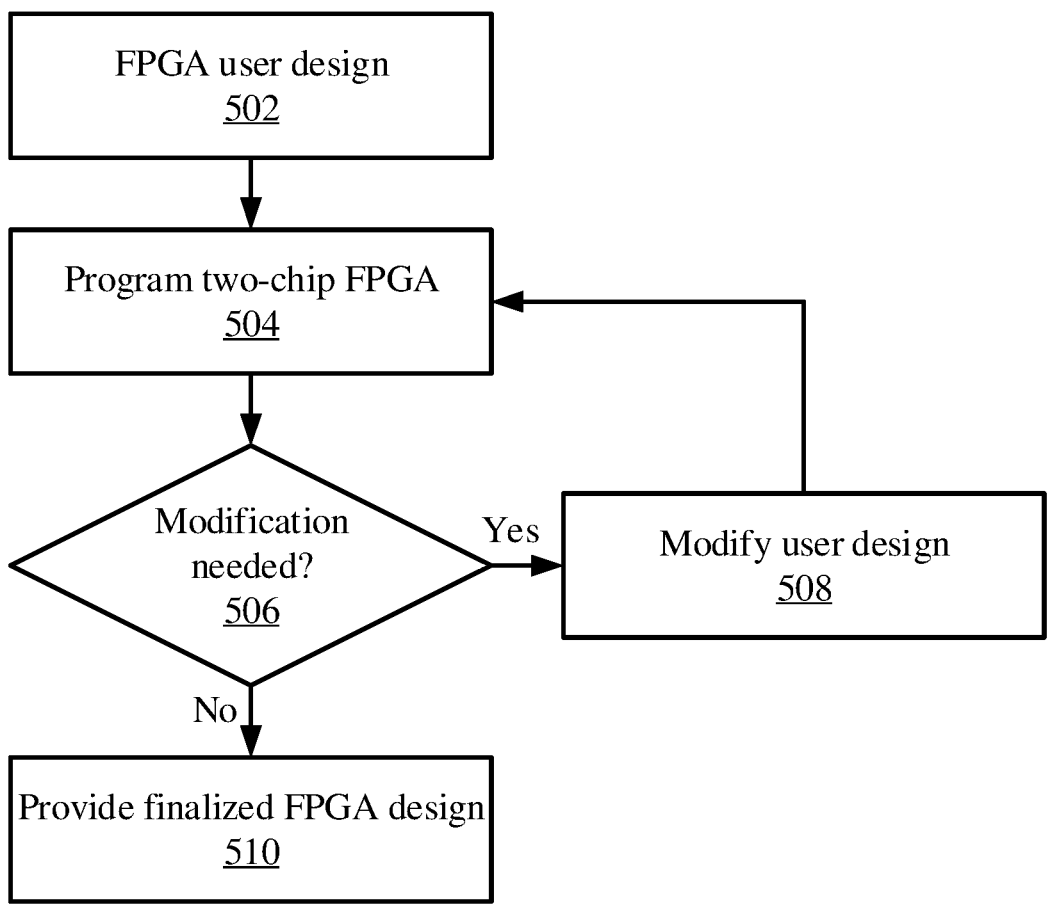
FIG. 5 is a block/flow diagram of a method of designing a circuit for a two-chip FPGA device, in accordance with an embodiment of the present invention.

Referring now to FIG. 5, a design process for a two-chip FPGA device is shown. Block 502 creates a circuit design. This design process may include, for example, a user generating a circuit design using a hardware description language (HDL) that is suitable for use with an FPGA device. The user's circuit design may then be implemented in a two-chip FPGA device, for example using a configurable routing chip 200 and a functional chip 210, with configuration instructions being stored in CRAM of the configurable routing chip 200.

During FPGA user design testing and development in a prototyping phase, it may be determined in block 506 that modifications to the user circuit design are needed. If so, block 508 makes such modifications to the circuit design, which may be programmed in the two-chip FPGA device in block 504. This process of user design testing and/or development may be continued until no further modifications are needed.

At this stage, a finalized FPGA design may be provided in block 510. This finalized design may include instructions to implement the circuit design during operation. This two-chip FPGA device may thus be used directly, without further hardening, and will provide the decreased propagation signal path length described above, with the associated performance benefits. The two-chip FPGA device may have substantially smaller circuit area than a corresponding single-chip FPGA device would, as the three-dimensional circuit design makes use of vertical stacking. As a result, the functional chip 210 may include a larger number of functional blocks in a given area than would be possible in a single-chip device.

Figure 6:
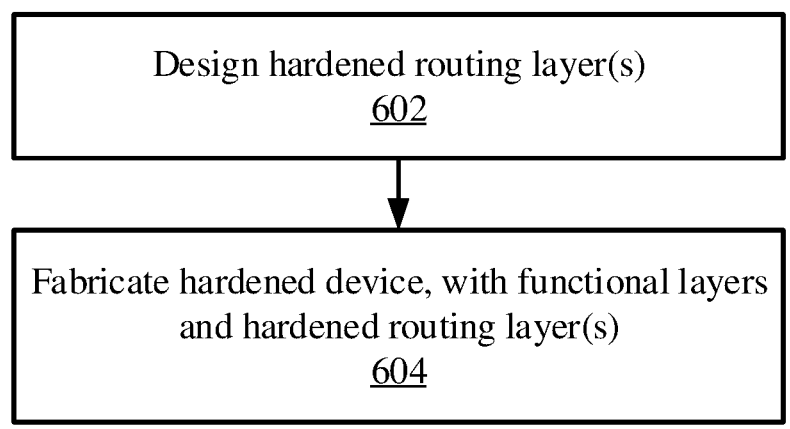
FIG. 6 is a block/flow diagram of forming a hardened FPGA device that uses hardened routing layers instead of a configurable routing chip, in accordance with an embodiment of the present invention.

Referring now to FIG. 6, a design process for a hardened FPGA device is shown. Once an FPGA circuit design is finalized for the two-chip FPGA device, as in FIG. 5, that circuit design may be used to design a hardened device in block 602, as shown in FIG. 4. This may include designing routing layer(s) 400. As described in greater detail above, the design of the hardened routing layer(s) 400 may replicate the signal outputs of a configurable routing chip 200 from the finalized two-chip FPGA circuit design, including signal paths and configuration signals. In some cases, the configuration signals of the configurable routing chip 200 may be replicated with hardwired power connections to the functional layers 210. Block 604 may then fabricate the hardened device according to the hardened routing layers' design.

As noted above, the hardened routing layer(s) 400 may be integrated with the functional layers 210, for example as additional layers that are formed on top of the functional layers 210, with interconnects and vias embedded therein. The functional layers 210 may be identical to the layers of the functional chip 210 used in the configurable two-chip FPGA devices provided according to FIG. 5, or may be modified to include hardwired configuration paths. The hardened routing layer(s) 400 provide routing for the functional layers 210.

As described herein, programmable logic devices (PLDs) are a type of integrated circuit that can be programmed to perform specified logic functions. One type of PLD, the FPGA, may include an array of programmable tiles. These programmable tiles can include, for example, input/output blocks (IOBs), configurable logic blocks (CLBs), BRAMs, multipliers, DSP data path elements or blocks, processors, clock managers, delay lock loops (DLLs), and so forth.

Each programmable tile may include both programmable interconnect and programmable logic. The programmable interconnect may include a large number of interconnect lines of varying lengths, interconnected by programmable interconnect points (PIPs), which may be configured to connect various circuit components in accordance with their operational relationships. The programmable logic implements the logic of a user design using programmable elements that can include, for example, function generators, registers, arithmetic logic, and so forth.

The programmable interconnect and programmable logic may be initialized by loading a stream of configuration data into internal configuration memory cells that define how the programmable elements operate. The configuration data can be read from memory (e.g., from an external programmable read only memory (PROM)) or written into the FPGA by an external device. The collective states of the individual memory cells then determine the function of the FPGA.

Another type of PLD is the Complex Programmable Logic Device (CPLD). A CPLD includes two or more "function blocks" connected together and to input/output (I/O) resources by an interconnect switch matrix. Each function block of the CPLD may include a two-level AND/OR structure similar to those used in Programmable Logic Arrays (PLAs) and Programmable Array Logic (PAL) devices. In CPLDs, configuration data may be stored on-chip in non-volatile memory. In some CPLDs, configuration data is stored on-chip in non-volatile memory, then downloaded to volatile memory as part of an initial configuration (programming) sequence.

For all of these programmable logic devices PLDs, the functionality of the device is controlled by data bits provided to the device for the purpose of configuring the device. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include, but are not limited to, these exemplary devices, as well as encompassing devices that are only partially programmable. For example, some types of PLD include a combination of hard-coded transistor logic and a programmable switch fabric that programmably interconnects the hard-coded transistor logic.

The present embodiments may be implemented as fixed hardware or in the form of a PLD, for example as elements of an FPGA that are configured to take the form of a circuit. As noted above, an FPGA is a device that provides reconfigurable circuitry, for example in the form of configurable logic blocks and configurable interconnects. The logic blocks may include LUTs that provide arbitrary logic operations with rapid execution.

A circuit design may be specified using a hardware description language (HDL), such as Verilog or VHDL. The HDL uses human-readable instructions in a source file to define functional relationships between components of a circuit. The HDL source file for the circuit may then be synthesized to generate a set of circuit components. In the context of FPGAs, synthesis may include identifying sets of circuit components to implement the user-specified functions. In some cases, this may include combining multiple user-specified operations into a single logic block or cell. Thus, as described herein, multiple different operations may be automatically combined into a single configurable cell. Mapping is then performed, taking the results of the synthesis and mapping circuit components onto available parts of the FPGA hardware. Routing is performed to establish connections between the components of the FPGA hardware. This process generates a set of instructions for the FPGA, sometimes called a bitfile, which the FPGA loads upon initialization to implement the circuit.

As a result, circuits may be embodied in fixed hardware, in a configured FPGA, or in a set of instructions that may be used to configure an FPGA. For example, such instructions may include an HDL source file that specifies circuit components and functions in a human-readable format. In another example, such a definition include a bitfile that provides machine-readable instructions to the FPGA hardware to implement the circuit. Such instructions may therefore be encoded in a non-transitory medium which, when read and executed by FPGA hardware, cause the FPGA hardware to initialize the circuit.

Embodiments may include circuit definition instructions that are accessible from a computer-usable or machine-readable medium providing hardware definition code for use by or in connection with an FPGA. A computer-usable or machine-readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a machine-readable storage medium such as a semiconductor or solid state memory, a removable memory device, a random access memory (RAM), a read-only memory (ROM), a flash memory, a rigid magnetic disk, an optical disk, etc.

The circuit definition instructions may be tangibly stored in a machine-readable storage media or device (e.g., flash memory or magnetic disk) readable by a general or special purpose programmable computer or by an FPGA, for setting the hardware configuration of the FPGA when the storage media or device is executed. Embodiments may also be considered to be embodied in a machine-readable storage medium, configured with a computer program, where the storage medium so configured causes an FPGA to implement one or more circuits described herein.

A data processing system suitable for storing and/or executing circuit definition instructions may include at least one processor coupled directly or indirectly to memory elements through a system bus. The memory elements can include local memory employed during compilation of the circuit definition instructions and initialization of associated circuits, bulk storage, and cache memories. Input/output or I/O devices (including but not limited to keyboards, displays, pointing devices, etc.) may be coupled to the system either directly or through intervening I/O controllers. Network adapters may also be coupled to the system enable transmission of circuit program instructions to an FPGA device. Modems, cable modem and Ethernet cards are just a few of the currently available types of network adapters.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term "direct" or "directly," in reference to a connection between two circuit components, refers to a connection that includes only a transmission line or interconnect, without any other active or passive circuit components in the connection between the two circuit components.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C)

only, or the selection of all three options (A and B and C). This may be extended, as readily apparent by one of ordinary skill in this and related arts, for as many items listed.

Having described preferred embodiments of a three-dimensional FPGA with hardening (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A circuit device, comprising:
    a first chip that includes a plurality of functional blocks, wherein the first chip lacks interconnections between the plurality of functional blocks; and
    a second chip that includes:
        routing circuitry that provides configurable signal communications between functional blocks of the first chip; and
        configuration memory that controls the routing circuitry and that further controls operation of the plurality of functional blocks of the first chip.

2. The circuit device of claim 1, wherein the plurality of functional blocks include a configurable logic block that performs a logic function in accordance with a configuration signal provided by the configuration memory.

3. The circuit device of claim 1, wherein the routing circuitry includes a plurality of routing blocks, each routing block being associated with a respective functional block of the plurality of functional blocks.

4. The circuit device of claim 3, wherein configuration memory includes a plurality of configuration random access memory (CRAM) blocks, each associated with a respective routing block of the plurality of routing blocks.

5. The circuit device of claim 4, wherein each of the plurality of CRAM blocks includes routing configuration memory that controls the routing circuitry.

6. The circuit device of claim 4, wherein each of the plurality of CRAM blocks includes functional block configuration memory that controls the operation of the respective functional block.

7. The circuit device of claim 3, wherein each of the plurality of routing blocks includes interconnects to a respective functional block of the plurality of functional blocks and to at least one other routing block of the plurality of routing blocks.

8. The circuit device of claim 1, further comprising inter-chip connection structures that connect the plurality of functional blocks on the first chip to the routing circuitry of the second chip.

9. The circuit device of claim 1, where n the first chip is fabricated with a first fabrication process having a first minimum feature size and wherein second chip is fabricated with a second fabrication process having a second minimum feature size, the second minimum feature size being larger than the first minimum feature size.

10. The circuit device of claim 1, wherein the second chip is mounted on the first chip using a system on integrated chip process.

11. A circuit device, comprising:
    functional layers that include a plurality of functional blocks and a hardwired configuration path that outputs a configuration signal to control operation of a configured functional block of the plurality of functional blocks; and
    routing layers that include a hardwired routing interconnect between a pair of functional blocks of the first chip.

12. The circuit device of claim 11, wherein the plurality of functional blocks include a configurable logic block that performs a logic function in accordance with a configuration signal provided by the configuration memory.

13. The circuit device of claim 11, wherein the functional layers are fabricated with a first fabrication process having a first Mini MUM feature size and wherein the routing layers are fabricated with a second fabrication process having a second minimum feature size, the second minimum feature size king larger than the first minimum feature size.

14. The circuit device of claim 11, wherein the hardwired configuration path includes a fixed binary voltage output.

15. The circuit device of claim 11, further comprising inter-layer connection structures that connect the hardwired routing interconnect of the routing layers to the pair of functional blocks of the functional layers.

16. The circuit device of claim 11, wherein the routing layers are formed directly on the functional layers.

17. The circuit device of claim 11, wherein the functional layers lack interconnections between the plurality of functional blocks.

18. A configurable routing chip, comprising:
    a plurality of inter-chip contacts;
    routing circuitry that implements configurable signal communications between a pair of inter-chip contacts, including a plurality of routing blocks; and
    a plurality of routing configuration random access memory (CRAM) blocks that control the routing circuitry, each associated with a respective routing block of the plurality of routing blocks; and
    a plurality of functional block CRAM blocks that output configuration signals to the inter-chip contacts.

19. The configurable routing chip of claim 18, wherein the routing blocks are implemented in a grid on the configurable routing chip, lacking logic circuitry between the plurality of routing blocks.

* * * * *